(No Model.) 2 Sheets—Sheet 1.

L. W. BOYER.
ANTI FRICTION BEARING.

No. 346,716. Patented Aug. 3, 1886.

Witnesses:
David S. Williams
William J. Davis

Inventor:
Louis W. Boyer
by his Attorneys:
Howson and Sons (No Model.) 2 Sheets—Sheet 2.

L. W. BOYER.
ANTI FRICTION BEARING.

No. 346,716. Patented Aug. 3, 1886.

Witnesses:
William J Davis
David S. Williams

Inventor:
Louis W. Boyer
by his Attorneys

UNITED STATES PATENT OFFICE.

LOUIS W. BOYER, OF SAN FRANCISCO, CALIFORNIA, ASSIGNOR TO THE ROLLER BEARING COMPANY, OF NEW YORK, N. Y.

ANTI-FRICTION BEARING.

SPECIFICATION forming part of Letters Patent No. 346,716, dated August 3, 1886.

Application filed September 18, 1885. Serial No. 177,419. (No model.)

*To all whom it may concern:*

Be it known that I, LOUIS W. BOYER, a citizen of the United States, residing in San Francisco, California, have invented certain Improvements in Anti-Friction Bearings, of which the following is a specification.

My invention consists of certain improvements in anti-friction-roller devices for bearings, wheels, pulleys, &c.

Figure 1:
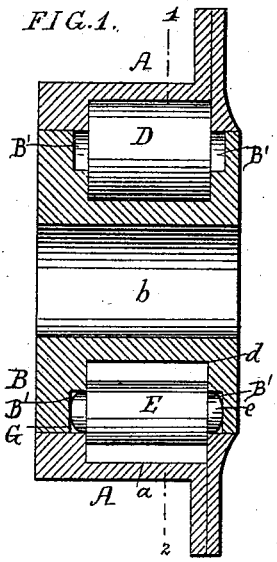
Figure 2:
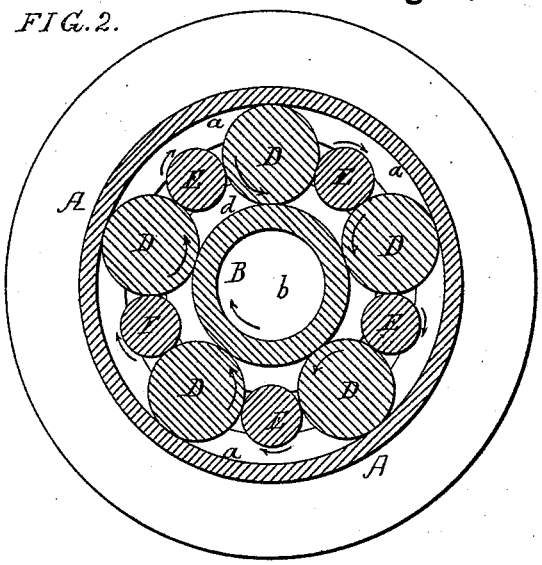
Figure 3:
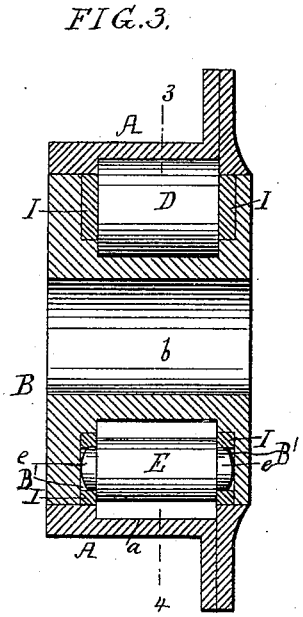
Figure 4:
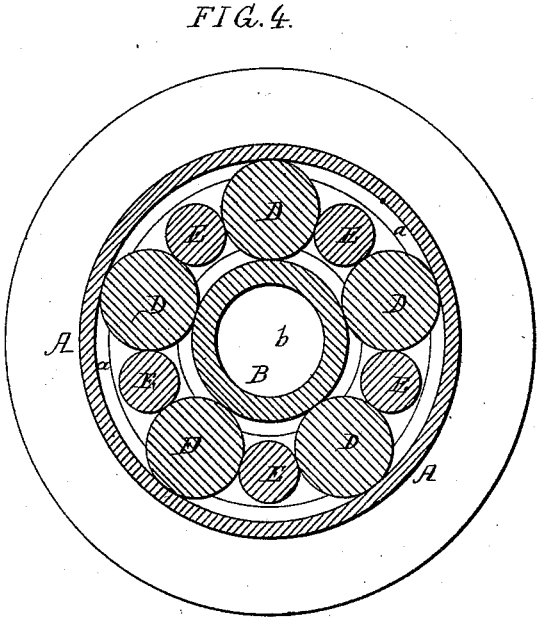
Figure 6:
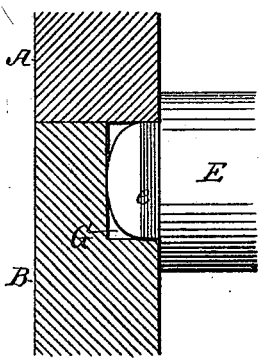
Figure 7:
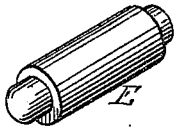
Figure 8:
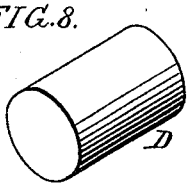
Figure 5:
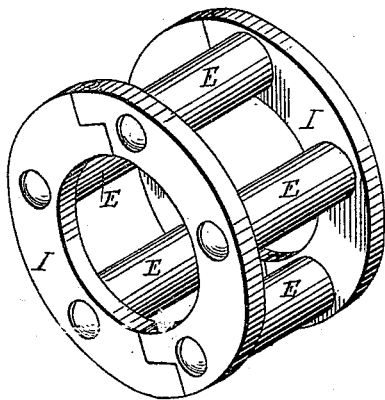

In the accompanying drawings, Figure 1 is a vertical section of one form of my improved anti-friction-roller device. Fig. 2 is a section on the line 1 2, Fig. 1. Fig. 3 is a vertical section of a modified form. Fig. 4 is a section on the line 3 4, Fig. 3. Fig. 5 is a perspective view of the rollers and rings detached from the casing. Fig. 6 is an enlarged detached sectional view showing the bearing of the spacing-rollers. Fig. 7 is a perspective view of one of the spacing-rollers, and Fig. 8 is a perspective view of one of the anti-friction-bearing rollers.

Referring to the construction shown in Figs. 1, 2, and 6, A is the casing, which may be secured to or form part of a bearing-block, wheel, or pulley, and B is a hub secured to or forming part of the shaft for which the bearing is provided.

D is a series of anti-friction rollers, five in the present instance, which have their bearings on the inner annular face, $a$, of the casing A, and on the periphery $d$ of the hub B. Between these rollers D are alternate spacing-rollers E, less in diameter than the rollers D, and as the bearing-rollers D turn in the direction of their arrows, Fig. 2, the spacing-rollers E turn in the opposite direction, acting as anti-friction rollers between the two rollers D. It should be here remarked that this arrangement of large and small rollers is of itself old in anti-friction wheels and pulleys, and that my invention consists in constructing the devices in the manner which I will now proceed to describe. The hub B is recessed out for the reception of these wheels and pulleys, so as to form at each end flanges B' B', forming part of the hub. A groove, G, is cut into each flange B' of the hub for the reception of the ends of the spacing-rollers E, which are provided thus with peripheral bearings in these grooves to the extent indicated by the line $e$ in Fig. 6, as distinguished from conical bearings, which have a tendency to cause the spacing-rollers to jam under the pressure of the bearing-rollers. The ends of these rollers E may be reduced, as shown in Figs. 1, 6, and 7, to form these bearing-surfaces to occupy the grooves G in the flanges B'; or, if preferred, the grooves G in the flanges B' may be made large enough to receive the full diameters of the rollers E. This manner of providing the hub with flanges B', having grooves G, forming peripheral bearings for the spacing-rollers, constitutes an economical, convenient, and effective construction of anti-friction bearing. The rollers E are prevented from moving lengthwise by their ends coming into contact with the bottoms of the grooves, or by the shoulders on the rollers coming into contact with the flanges B'.

In the construction shown in Figs. 3, 4, and 5, separate rings I I are provided to form bearings for the spacing-rollers E, which are thus kept in place and cannot in any case crowd the bearing-rollers. These rings are preferably made in two parts with overlapping ends, united as shown in Fig. 5, so that the two-part rings and their rollers can be placed around the hub B, the rings being adapted to the grooves G in the flanges B' B'.

I claim as my invention—

1. The hub having flanges B' B', provided with grooves G, in combination with a casing and two sets of alternating rollers, those of one set being smaller in diameter than those of the other set, and having peripheral bearings in the grooves of said flanges, substantially as set forth.

2. The hub having flanges B' B', and bearing-rings therein, in combination with a casing and two sets of alternating rollers, those of one set being smaller in diameter than those of the other set, and having peripheral bearings in said rings, substantially as described.

In testimony whereof I have signed my name to this specification in the presence of two subscribing witnesses.

LOUIS W. BOYER.

Witnesses:
WILLIAM F. DAVIS,
HENRY HOWSON.